United States Patent [19]

Cullum

[11] Patent Number: 4,888,653
[45] Date of Patent: Dec. 19, 1989

[54] HIGH SPEED VIDEO TAPE DUPLICATOR

[75] Inventor: Dennis Cullum, Leucadia, Calif.

[73] Assignee: Eastman Kodak Company, Rochester, N.Y.

[21] Appl. No.: 138,277

[22] Filed: Dec. 28, 1987

[51] Int. Cl.$^4$ .................... G11B 5/86; G11B 15/14
[52] U.S. Cl. .................................. 360/15; 360/64
[58] Field of Search .............................. 360/15, 64

[56] References Cited

U.S. PATENT DOCUMENTS

| | | | |
|---|---|---|---|
| Re. 27,685 | 5/1973 | Nelson | 179/100.2 |
| 2,805,862 | 9/1957 | Soubrier | 274/4 |
| 3,496,304 | 2/1970 | Nelson | 179/100.2 |
| 3,683,123 | 8/1972 | Fukuda | 179/100.2 |
| 3,699,269 | 10/1972 | Smaller | 179/100.2 |
| 3,767,206 | 10/1973 | Rehklau et al. | 243/3 |
| 3,875,588 | 4/1975 | Bennett | 360/15 |
| 3,893,167 | 7/1975 | Stahler | 360/16 |
| 3,928,868 | 12/1975 | Grindley et al. | 360/15 |
| 4,110,797 | 8/1978 | Hoshino et al. | 360/17 |
| 4,320,486 | 3/1982 | Cooley et al. | 369/14 |

*Primary Examiner*—Vincent P. Canney
*Attorney, Agent, or Firm*—Robert F. Cody

[57] ABSTRACT

A video tape duplicator for duplicating a video signal simultaneously on a plurality of video tapes at high speed. The duplicator includes a source for providing a high frequency video signal and a record head for simultaneously recording the high frequency video signal on a plurality of duplicate magnetic tapes. The record head rotates at a speed which is related to the frequency of the high frequency signal so that the duplicate tape may be played back at normal head and tape speeds.

4 Claims, 2 Drawing Sheets

4,888,653

HIGH SPEED VIDEO TAPE DUPLICATOR

BACKGROUND OF THE INVENTION

This invention relates in general to apparatus for duplicating magnetic tape and more particularly, to apparatus for simultaneously duplicating a plurality of video tapes at high speed.

The overwhelming popularity of video cassette recorders for viewing prerecorded video tapes of theatrical movies, of do it yourself video programs and the like, has created the need for a way to duplicate a master video tape onto thousands of duplicate video tapes in a fast, economical and efficient manner. Several techniques have been proposed for effecting the duplication of both audio and video tapes. The simplest technique (as disclosed, for example, in U.S. Pat. No 3,767,206, issued Oct. 23, 1973, for CASSETTE TO CASSETE DUPLICATING MEANS), provides for a master cassette tape recorder to control several similar slave recorders which duplicate the master tape onto duplicate tapes. (See also, U.S. Pat. No. 3,875,588, issued Apr. 1, 1975 for MAGNETIC TAPE DUPLICATING APPARATUS: and U.s. Pat. No. 3,928,868, issued Dec. 23, 1975, for TAPE DUPLICATING DEVICE) This technique is disadvantageous because of the expense in requiring a separate recorder for each copy of the master tape to be duplicated. Thus, in order to reproduce thousands of duplicate copies of a master tape at the same time, thousands of slave recorders must be controlled by the master recorder. The complexity and expense of such an arrangement is evident.

Another technique for duplicating magnetic tape is disclosed in U.S. Pat. No. 3,893,167, issued July 1, 1975 for MAGNETIC TAPE DUPLICATOR. As disclosed, high speed contact duplicating of a master magnetic tape is effected with a duplicate magnetic tape. This technique is disadvantageous in requiring a special master tape which has a high coercivity so that the signal on the master tape is not erased during the copying process. See also: U.s. Pat. No. 3,893,167, issued July 1, 1975, for MAGNETIC TAPE DUPLICATOR. A similar technique is disclosed in U.S. Pat. No. 3,683,123, issued Aug. 8, 1972, for METHOD OF DUPLICATING MAGNETIC RECORDING TAPES USING BOTH SURFACES OF MASTER TAPE FOR IDENTICAL SIGNALS. As disclosed in this patent, duplicate magnetic recordings are simultaneously transferred onto superimposed duplicate magnetic tapes which sandwich a master magnetic tape. The master tape has opposed surfaces, each of which carries a master recording to be duplicated. The latter technique is disadvantageous in requiring a special master tape having magnetic material on both sides.

Several duplicating techniques have centered on the use of an intermediate medium onto which a copy of the master recording is first made and a duplicate recording is made from the intermediate medium. Thus, for example, in U.S. Pat. No. 3,699,269, issued Oct. 17, 1972, for DOUBLE TRANSFER TAPE COPY SYSTEM, there is disclosed a method and apparatus for thermomagnetically and magnetically transferring short and long wavelength signals from a master magnetic tape to a pair of magnetizable layers of an intermediate carrier. The signal on the intermediate carrier is subsequently transferred to a duplicate tape. (See also U.S. Pat. No. 3,496,304 issued Feb. 17, 1970, for DOUBLE TRANSFER CURIE POINT AND MAGNETIC BIAS TAPE COPY SYSTEM reissued June 26, 1973 as Re. No. 27,685)Another intermediate transfer technique is disclosed in US Pat. No. 4,320,486 issued Mar. 16, 1982, for TRANSFERRING INFORMATION SIGNALS FROM A FIRST TO A SECOND RECORDING MEDIUM. As disclosed in this patent, information signals from a magnetic tape are reproduced and recorded onto a second magnetic tape by first recording the signals on an optical storage device, such as an optical disc. These intermediate transfer type duplicating techniques are disadvantageous in the complexity and expense of providing the intermediate transfer member.

SUMMARY OF THE INVENTION

According to the present invention, there is provided a high speed duplicating apparatus for magnetic tape which obviates the disadvantages of proposed duplicating techniques. According to the present invention, the expense and complexity of an intermediate transfer member between the master tape and the duplicate tape is eliminated. Moreover, according to the invention, there is eliminated the necessity of having a special high coercivity master tape which is required in contact duplicating techniques. According to an aspect of the present invention, high speed duplicating apparatus is provided which includes a source for providing a high frequency signal and record head means for simultaneously recording the high frequency signal on a plurality of duplicate tapes. The frequency of the high frequency video signal and the record head speed are related so that the duplicate tape may be played back at normal head and tape speeds during standard field and frame intervals.

DESCRIPTION OF THE PREFERRED EMBODIMENT

Figure 1:
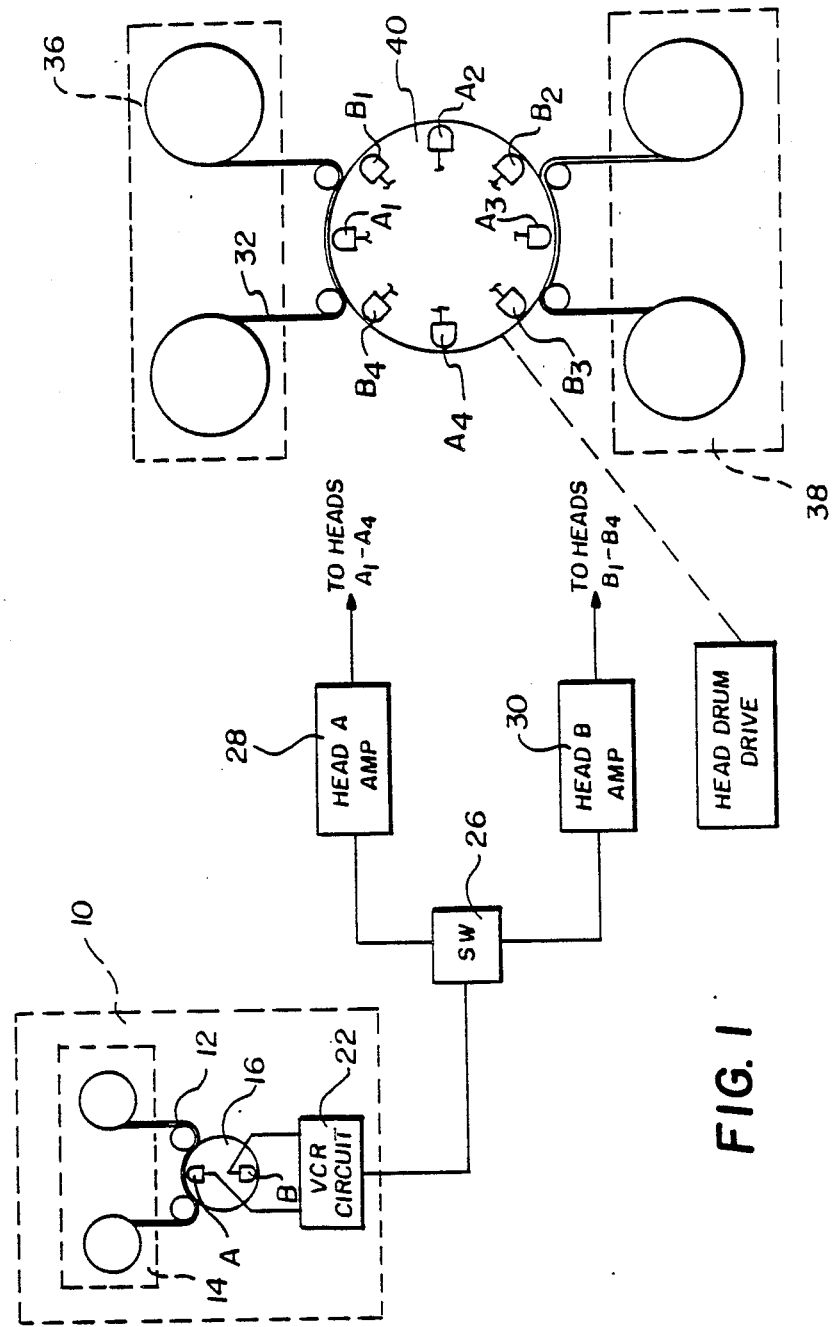
FIG. 1 is a schematic block diagram of a preferred embodiment of the present invention.

Referring now to the figures, there is shown a preferred embodiment of the high speed tape duplicating apparatus of the present invention. As shown, a source of a high frequency video signal such as video cassette recorder (VCR) 10 is provided for playing back master magnetic tape 12 contained in cassette 14. VCR 10 includes a playback head drum 16 having magnetic heads A and B for playing back video signals recorded on tape 12. As shown in FIG. 3, a frame of video signal is recorded in tracks 18 and 20 on tape 12. In the VHS format, video signals are recorded on half inch magnetic tape in which the length T of tracks 18 and 20 is approximately four inches. during normal record and playback, head drum 16 is rotated at 1800 revolutions per minute so that each head A and B is in contact with tape 12 for 180 degrees or one-half revolution. Thus, the two video fields of a complete frame of video are played back in one complete rotation of the head drum 16. As shown in FIG. 2A, head drum 16 has a diameter, for example, of 2.6 inches and a circumference of approximately 8 inches. Thus, during contact of head A or head B with tape 12 for a half revolution of drum 16, a track length T of four inches is scanned.

In order to effect a high frequency video signal, heads A and B of head drum 16 are rotated at N times normal rotational speed and tape 12 is moved past drum 16 at N times its normal tape speed. Thus, a high frequency video signal is produced which has a frequency which is N times the frequency of the normal video signal. This high frequency video signal is processed by VCR circuit 22 and is alternately applied by means of switch 26 to head A amplifier circuit 28 and head B amplifier circuit 30.

According to a feature of the present invention, the video signals provided by amplifier circuits 28 and 30 are simultaneously recorded on a pair of duplicate magnetic tapes 32 and 34 contained in cassettes 36 and 38 respectively. Recording is effected by means of record head drum 40 which has a plurality of first heads $A_1$, $A_2$, $A_3$, $A_4$ and a plurality of seconds heads $B_1$, $B_2$, $B_3$ and $B_4$. The high frequency video signals from head A amplifier circuit 28 are applied in parallel to heads $A_1$, $A_2$, $A_3$ and $A_4$, while the high frequency video signals from head B amplifier circuit 30 are applied in parallel to heads $B_1$, $B_2$ and $B_3$, and $B_4$. Each pair of heads $A_1$, $B_1$; $A_2$, $B_2$, $A_3$ $B_3$; and $A_4$, $B_4$ records a frame of video signal on tapes 32 and 34 at N times the head speed at which the signals are normally played back. Thus, for example, a standard NTSC video signal has a field period of 1/60 sec. According to the invention the high frequency signal is recorded in 1/N the field period thus increasing duplicating speed by N times. Since two or more tapes are duplicated simultaneously, the duplicating speed is further increased by a factor equal to the number of tapes being duplicated. The circumferential spacing between adjacent heads on both head drums 16 and 40 are equal to the track length T of a field of video signal on master tape 12 and duplicate tapes 32, 34 (Fig 3). Thus, a field of video signal is recorded in the same length of track on duplicate tapes 32 and 34 at N times the normal head speed. However, since the video signal recorded on tapes 32 and 34 is N times the frequency of the video signal normally played back, tapes 32 and 34 may be played back at normal head and tape speeds to produce a video signal within the standard field period.

Figure 2B:
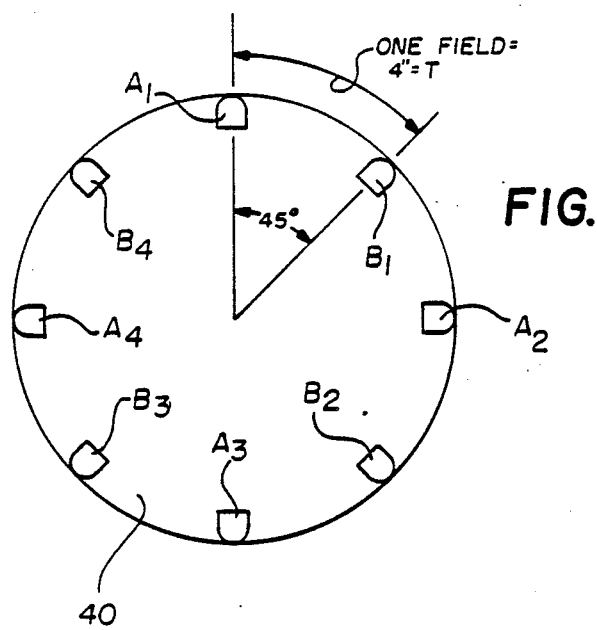
FIGS. 2A and 2B are diagrammatic illustrations of playback head means and record head means useful in describing the operation of the apparatus of FIG. 1.
Figure 2A:
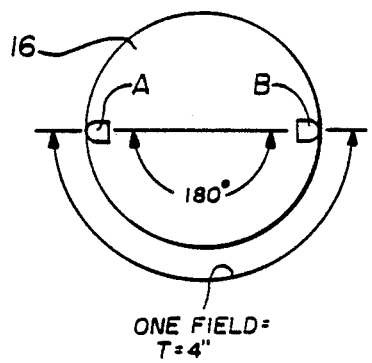
Figure 3:
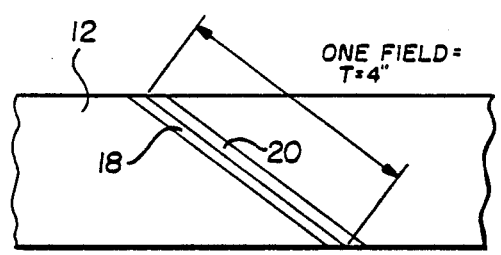
FIG. 3 is a diagrammatic representation of magnetic tape.

Referring to FIGS. 2A and 2B, the high speed duplicating apparatus of the present invention is more clearly illustrated. As shown in FIG. 2A, playback head drum 16 has a diameter, for example, of 2.6 inches and a circumference of 8 inches. Heads A and B are separated by an angle of 180° and by a circumferential spacing of approximately 4 inches, which equals the length T of a track 18 or 20 on tape 12. The record head drum 40 shown in FIG. 2B, on the other hand, has a diameter of approximately 10.2 inches and a circumference of 32 inches. The circumference of head drum 40 is therefore 4 times the circumference of head drum 16. The circumferential spacing between adjacent heads on head drum 40 is 4 inches. However, the angular distance between adjacent heads on head drum 40 is only 45 degrees, as compared to an angular distance of 180 degrees between the heads of head drum 16. Thus, if a video field is normally played back from tape 32 or 34 in 1/60 sec. at a normal rotational speed of the playback head drum of 1800 revolutions per minute, a video field will be recorded in $1/60 \div 8(N)$ sec. or 1/480 sec. by a head of head drum 40 on tapes 32 and 34, if drum 40 is rotated at 3600 revolutions per minute.

It will be appreciated that the present invention may be used to duplicate tapes in reel to reel equipment, in other tape formates (Beta, 8mm) and in other video signal standards (PAL, SECAM). It will also be appreciated that more than two tapes may be duplicated at one time.

The invention has been described in detail with particular reference to a preferred embodiment thereof, but it will be understood that variations and modifications can be effected within the spirit and scope of the invention.

What is claimed is:

1. Apparatus for high speed duplicating of video tape, comprising:

means for providing a high frequency video signal; and record head means for simultaneously recording said high frequency video signal on a plurality of duplicate magnetic tapes at a record head speed which is N times the head speed at which said recorded signal is normally played back such that the track length T of a field of video signal recorded on said duplicate magnetic tapes is equal to the normal track length of a field of video signal.

2. The apparatus of claim 1 wherein said record head means includes a record head drum having a plurality of pairs of heads, wherein the circumferential spacing between adjacent heads of said record head drum is equal to a distance T, and including duplicate tape transport means for simultaneously transporting a plurality of duplicate tapes past said record head drum means.

3. The apparatus of claim 1 wherein said video signal providing means includes playback head means for playing back video signals from a master magnetic tape at a rotational head speed which is N times the normal playback head speed so as to produce said high frequency video signal.

4. The apparatus of claim 3 including means for transporting said master tape past said playback head at a tape speed which is N times the normal tape playback speed.

* * * * *